United States Patent [19]

Klayum et al.

[11] E Re. 30,724

[45] Reissued Aug. 25, 1981

[54] LINE PROTECTOR HAVING ARRESTER AND FAIL-SAFE CIRCUIT BYPASSING THE ARRESTER

[75] Inventors: Milton A. Klayum, Itasca; Richard H. Greischar, Oak Park, both of Ill.

[73] Assignee: Reliable Electric Company, Franklin Park, Ill.

[21] Appl. No.: 58,011

[22] Filed: Jul. 16, 1979

Related U.S. Patent Documents

Reissue of:

[64] Patent No.: 3,755,715
Issued: Aug. 28, 1973
Appl. No.: 296,578
Filed: Oct. 11, 1972

[51] Int. Cl.[3] ..... H02H 9/06

[52] U.S. Cl. ..... 361/124; 361/119; 337/32

[58] Field of Search ..... 361/124, 118, 119, 120, 361/117, 131; 337/15, 28, 32, 33, 34, 29, 31; 315/125

[56] References Cited

U.S. PATENT DOCUMENTS

| | | | |
|---|---|---|---|
| 1,200,796 | 10/1916 | Arnold | 361/56 X |
| 1,201,646 | 10/1916 | Steinmetz | 361/120 |
| 3,254,179 | 5/1966 | Howard | 361/124 X |
| 3,254,181 | 5/1966 | Lemieux | 361/117 X |
| 3,543,207 | 11/1970 | Kawiecki | 337/28 |
| 3,569,786 | 3/1971 | Kunugi | 361/120 X |
| 3,651,380 | 3/1972 | Peche et al. | 361/120 |
| 3,651,440 | 3/1972 | Bahr et al. | 361/124 X |

*Primary Examiner*—Patrick R. Salce
*Attorney, Agent, or Firm*—Trexler, Wolters, Bushnell & Fosse, Ltd.

[57] ABSTRACT

A line protector has an arrester through which overvoltages on the line of short duration are grounded. The arrester may be of the type having an arc gap sealed within a gas tube. For an overvoltage of longer duration, a pellet is melted causing a spring to close a circuit bypassing the gas tube and provide a direct metallic path from the line to ground. A secondary arc gap between opposed conductors separated by an insulating sleeve has an arc-over voltage that is greater than the normal arc-over voltage of the first-mentioned arc gap and provides a path to ground for short duration overvoltage conditions in the event of failure of the arrester. Excessive current across the secondary arc gap may melt the insulator sleeve and engage the opposed conductors for grounding purposes.

16 Claims, 4 Drawing Figures

LINE PROTECTOR HAVING ARRESTER AND FAIL-SAFE CIRCUIT BYPASSING THE ARRESTER

Matter enclosed in heavy brackets [ ] appears in the original patent but forms no part of this reissue specification; matter printed in italics indicates the additions made by reissue.

BACKGROUND OF THE INVENTION

This invention relates to line protectors for communications circuits, such as telephone lines and the like.

The type of line protector with which the present invention is concerned is one that is intended primarily for protection of wire conductors and equipment connected thereto from electrical overvoltage conditions which may result from lightning, electrical power faults, and the like. Protectors for this purpose may take various forms. Frequently, they are of the type that contain an arc gap across which the overvoltage will be applied whereby an overvoltage of short duration will cause conduction across the arc gap to ground. After the short duration overvoltage condition has passed, the protector returns to its normal or nonconducting state. The arc gap may be in an arrester comprised of spaced carbon electrodes separated by air, or the arc gap may be in a sealed gas tube. The sealed gas tube arrester is essentially a cold cathode discharge tube. Gas tube arresters have a much greater useful life than arresters embodying carbon electrode air gaps.

It has been recognized that overvoltage conditions of relative long duration can cause breakdown of the ordinary type of arrester whether of the arc gap type or otherwise. With reference to gas tubes in particular, it is known to provide various fail-safe methods internally of the gas tube to protect the line in the event of failure of the gas tube due to an overvoltage condition of long duration. Arrangements of this type generally require nearly destructive conditions within the gas tube in order for the fail-safe mechanism to become operative. Such conditions can frequently result in loss of gas and consequent loss of protection before the fail-safe mechanism comes into operation. This may allow damaging overvoltage conditions to remain on the line. Furthermore, gas tubes with internal fail-safe arrangements often require an expensive construction and various compromises as to electrode materials, gas mixture and pressure, and the like, in order to allow for fail-safe operation while at the same time providing for normal short duration overvoltage protection.

OBJECTS AND SUMMARY OF THE INVENTION

It is an object of this invention to provide a line protector of the type and for the purpose stated which has a fail-safe circuit external to the arrester whereby an overvoltage of such magnitude and duration as would be destructive of the arrester causes the external circuit to close and form a direct path to ground that bypasses the arrester.

It is a further object of this invention to provide a line protector of the type stated that does not require any special or expensive construction for the arrester unit.

It is a still further object of this invention to provide a line protector of the type stated in which the fail-safe circuit is not prevented from operation because of a malfunction of the arrester.

It is a further and important object of this invention to provide a protector that has a secondary arc gap for discharge of current to ground in the event of failure of the arrester.

In accordance with the foregoing objects an embodiment of the invention comprises an outer shell or cap that is adapted to be threaded into the well of a protector block or base whereby one side of the protector can be connected to the line and the other side can be connected to a ground terminal. Within the outer shell is a shunt that forms a low inductance, high current-carrying connection with the shell. Within the shunt is a conducting disc that conductively engages one of the electrodes of a gas tube surge arrester. The opposite electrode of the gas tube rests on a solder pellet, and the gas tube and the solder pellet are within a conductive cup. An insulating sleeve with a series of holes therein surrounds the cup and is, in turn, surrounded by the shunt. The cup is adapted to rest on a contact in the protector block. A spring within the cup applies pressure to the shunt, the disc, the insulating sleeve, and the arrester so that one of the electrodes of the arrester bears firmly against the disc. The other electrode of the arrester bears firmly against the solder pellet, which is supported by the base of the cup. The disc is prevented from engaging the cup so long as the solder pellet remains solid. On the other hand, if the solder pellet melts due to an overvoltage condition on the line of long duration the spring will cause the disc to engage the cup and form a metallic grounding circuit of high current carrying capacity bypassing the arrester. The perforated insulating sleeve provides a secondary arc gap between the cup and the shunt that has a arc-over voltage that is greater than the normal arc-over voltage of the arrester but less than the probable arc-over voltage of the arrester if the latter is defective.

DETAILED DESCRIPTION

Figure 1:
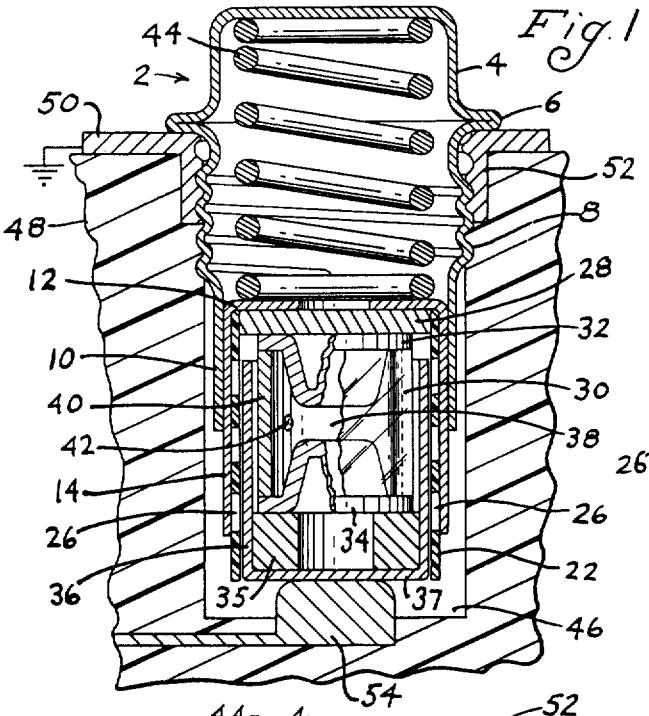
FIG. 1 shows a sectional view taken substantially through the central axis of a line protector constructed in accordance with and embodying the present invention, the protector being shown in its normal condition and being mounted in position in a block or base assembly.

Referring now in more detail to the drawing there is shown a line protector 2 that comprises a sheet metal shell or cap 4 having an annular radial flange 6 that is axially spaced from the end wall of the cap. The cap 4 has a cylindrical wall that is formed with a thread 8 and a depending cylindrical skirt 10 adjacent to the thread 8. The skirt 10 terminates in the open end of the cap 4.

Figure 4:
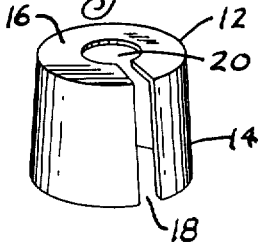
FIG. 4 is a perspective view of the shunt member that also forms part of the present invention.

Telescoped within and coaxial with the annular skirt 10 is a metallic shunt member 12. The shunt member 12 includes a side wall 14 and an end wall 16. As fabricated the side wall 14 is of somewhat frusto-conical shape (see FIG. 4) and is formed with longitudinal cutaway or slot 18 that extends into the end wall 16 and to a hole 20 therein, for purposes more presently fully appearing.

Figure 3:
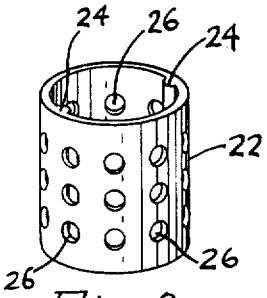
FIG. 3 is a perspective view of the insulating sleeve that forms part of the present invention.

Coaxially positioned within the shunt member 12 is a tubular insulating sleeve 22 that is formed of an extruded plastic of suitable type. This may be a polypropylene modified polyvinyl chloride resin. The insulating sleeve 22 is formed with opposed internal ribs 24, 24 that extend longitudinally of the tube wall. The sleeve 22 is also formed with an array of holes 26 that are disposed in a pattern extending around the sleeve and also lengthwise thereof, as best seen in FIG. 3. The wall thickness of the sleeve may be of the order of 0.30 mm.

Positioned within the upper end of the sleeve 22 and also coaxial within the shunt member 12 is an annular conductive disc 28. The disc 28 is in contact with the shunt member 12 at the end wall 16 thereof and is also in contact with one of the electrodes of a gas tube surge arrester 30. More specifically, the disc 28 is flush against the electrode 32 of the gas tube 30 while the other electrode 34 seats on a fusiable solder pellet 35 of annular ring-shaped configuration. The gas tube 30 and the solder pellet 35 are housed within a conductive cup 36, the bottom wall 37 of which supports the pellet 35. The side wall of the cup 36 telescopes coaxially within the insulating sleeve 22. The ribs 24, 24 assist in maintaining the cup 36 in assembled relation with the sleeve 22.

The gas tube 30 is a cold cathode tube in which the metallic electrodes 32, 34 are inwardly depressed toward each other to form an arc gap 38 that is sealed within the gas tube 30. By way of example, the gas tube 30 may have a cylindrical glass or ceramic wall 40 to which the electrodes 32, 34 are sealed at the ends thereof. The interior of the gas tube 30 may be filled with an inert gas or a radioactive gas such as tritium. Alternatively, the interior of the tube 30 may contain an inert gas and a spot or deposit of material 42 that contains a radioactive substance that prompts ionization of the tube. The radioactive substance may be, for example, promethium 147 mixed with a suitable inert binding agent.

A coil spring 44 is coaxially positioned within the cap 4 and has one end that abuts the end wall of the cap and another end that bears against the end wall 16 of the shunt member 12. When the foregoing components of the protector are assembled, there is a friction fit between the side wall of the cup 36 and the insulating sleeve 22 as well as between the sleeve 22 and the side wall 14 of the shunt member 12. There is likewise a friction fit between the skirt 10 and the side wall 14 of the shunt member. When the cap 4, with the spring 44 therein, is telescoped with the shunt member 12, the skirt 10 radially collapses the side wall 14, this being permitted by the slot 18, which tends to close. A modicum of pressure is applied to the side wall 14 by the skirt 10. The side wall 14 is pressed against the sleeve 22 which in turn presses against the cup 36. The spring 44 is in its normal expanded position; however, the fit between the various parts is sufficient to hold them together for normal handling and installation purposes.

The protector 2 is adapted to be mounted in the well 46 of a dielectric block 48. At the upper end of the well 46 is a metallic contact plate 50 having an internally threaded annular flange 52 for receiving the cap thread 8. The material of the block 48 below the flange 52 is also threaded for some distance so that the cap 4 may be threaded into the well 46 until the flange 6 abuts the contact plate 50. At the bottom of the well 46 is a metallic contact 54 that engages the base 37 of the cup 36. The contact plate 50 and the contact 54 are suitably connected to binding posts (not shown) or other suitable terminals whereby the plate 50 may be connected to ground and the contact 54 may be connected to the line to be protected, or vice-versa. In any event, a partial threading of the cap 4 into the well 46 causes the cup 36 to abut the contact 54. As the cap 4 is tightened down to its final position, the spring 44 is placed in compression. The disc 28 is of a diameter approximately the same as that of the cup 36 but is axially spaced therefrom due to the presence of the solder pellet 35.

Assuming that the contact 54 is connected to the line to be protected and that line is subjected to an ovevoltage of short duration, it will be apparent that this voltage will be applied at the conductive cup 36. If the voltage exceeds the firing voltage of the gas tube 30, an arc will appear at the arc gap 38 for current discharge to ground. Thus, the current will flow to ground in a series circuit that includes the solder pellet 35, the electrodes 32, 34, the arc gap 38, the disc 28, the shunt 12, and the cap 8. When the overvoltage condition has passed, the unit is automatically restored to its normal operating condition.

Figure 2:
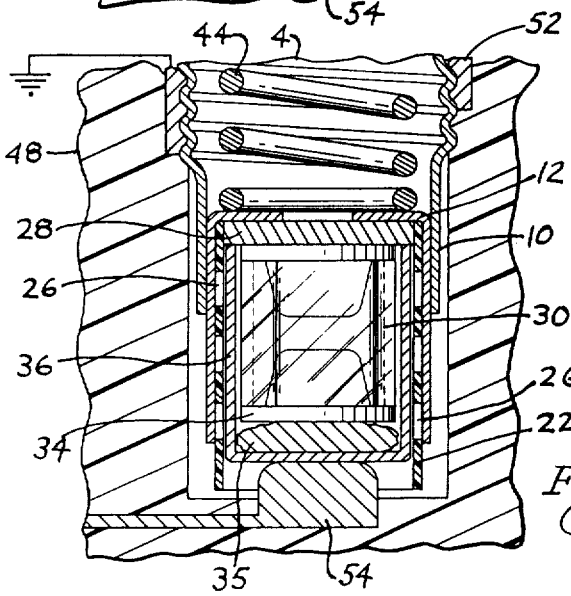
FIG. 2 is a sectional view similar to FIG. 1 but showing the condition of the protector after the latter has been subject to an overvoltage condition of relatively long duration.

On the other hand, if an overvoltage surge of long duration is applied at the contact 54 and hence at the cup 36, the current will be discharged to ground as aforesaid. However, the excessive current produced by the prolonged overvoltage condition causes the solder pellet 35 to be heated to the point where the solder pellet melts. The melting temperature of the solder pellet may, for example, occur within the range of 93° C. to 149° C. When the solder pellet melts, as shown in FIG. 2, the spring 44 urges the shunt 12, the insulating sleeve 26, the disc 28 and the gas tube 30 toward the base 37 of the cup 36, thereby bringing the disc 28 into contact with the upper edge of the cut 36. This condition now provides a direct, metallic circuit path from the cup 36 to the grounded plate 50 through the disc 28, the shunt 12 and the cap 4. The arc gap 38 is bypassed so that the line is grounded regardless of the condition or operation of the gas tube 30. Ordinarily, however, the melting point of the solder pellet is sufficiently low that the gas tube 30 is saved from destruction when an overvoltage condition of long duration is present on the line. To restore the protector it is necessary to remove the same from the well 46, and then disassemble and then reassemble the protector with a new solder pellet 35.

When the solder pellet melts the material thereof tends to be confined within the cup 36 so as not to interfere with the other functioning parts of the protector. Of course, the solder pellet solidifies when the line fault is removed so that it is a simple matter to remove it when the protector is disassembled.

It should be noted that the gas tube arrester provides continuous operation up to and including the time that the solder pellet melts to shunt the current around the gas tube. The shunt path has high current-carrying capacity and is of relatively low inductance. Moreover, the shunt path does not include the coil spring. This has several advantages. First, the spring is not subject to heat fatigue as a result of current flowing therethrough. In addition, arcing across coils of the spring is prevented so that the spring does not become an inductor to add to the impedance of the shunt circuit. Also, explosive arcs outside of the gas tube during high peak current discharges are eliminated. Such explosive arcs may compress the spring and blow the gas tube out of the circuit, thereby causing loss of transient voltage protection.

It should also be noted that the holes 26 in the insulating sleeve 22 provide an arc gap between the cup 36 and the shunt 12. This arc gap may be considered as a secondary arc gap that has an arc-over voltage that is greater than the normal firing voltage across the arc gap 38 in the gas tube 30. At the same time, however, it should be noted that the gap 38 is many times greater than the aforesaid secondary arc gap. Therefore, if the gas tube should become faulty as by a leak, the arc-over voltage at the arc gap 38 will then become much greater than the arc-over voltage of the secondary arc gap. Thus, the arc-over voltage across the secondary arc gap will limit the protector breakdown voltage. This latter voltage will be higher than normal firing voltage of the tube 30 but will at least serve to provide some line protection. Also, should an extreme over current condition result from prolonged arcing across the secondary arc gap, the thin insulating sleeve 22 may melt at least locally so that the shunt 12 is pressed against the cup 36. This forms a direct metallic path to ground.

While the present invention is primarily concerned with arc gap arresters of the gas tube type, it will be apparent from the foregoing description that other types of arresters may be used in some forms of the invention. Also, the fusible solder pellet may be a nonmetallic member that is melted by any known means as a result of the overvoltage condition of long duration. Such means could be a heat coil in proximity to the pellet and in series with the contact 54 and electrode 34.

The invention is claimed as follows:

1. A line protector comprising means forming a circuit that comprises in series a fusible solder pellet, spaced electrodes forming an arc gap, first conductor means for connection to a line to be protected, and second conductor means for connection to ground such that an overvoltage surge of short duration at said line will pass current through said series circuit for discharge to ground; said arc gap being sealed in a cold cathode gas tube of which said electrodes form a part; means including said solder pellet normally preventing said first and second conductor means being in contact, and spring means for bringing said first and second conductor means into contact exteriorly of said tube to bypass said arc gap upon melting of said solder pellet due to an overvoltage surge of longer duration across said series circuit and thereby provide a direct metallic path from said line to ground, *said gas tube having a central axis, means forming a secondary arc gap between said first and second conductor means comprising members that are radially outwardly of said axis, and a perforated insulating member between said members and in close contact with each.*

2. A line protector according to claim 1, [further including means forming a secondary arc gap between said first and second conductor means exteriorly of said tube] said secondary arc gap being less *in width* than the arc gap *width* in said tube and having an arc-over voltage that is greater than the arc-over voltage of the arc gap in said tube.

3. A line protector according to claim 1 in which one of said conductor means includes a cup, said solder pellet and said tube are in said cup, *said insulating member is* an insulating sleeve *that* surrounds said cup, and the other conductor means surrounds said insulating sleeve.

4. A line protector according to claim 3 in which said insulating sleeve is perforated [to provide an air gap between said sleeve and said other conductor means] *in a number of places.*

5. A line protector according to claim 4 in which said other conductor means includes a shunt member that surrounds said insulating sleeve and a cap that surrounds and engages said shunt member.

6. A line protector according to claim 5 in which said other conductor means further includes a disc within said shunt, said spring means is in said cap and imposes pressure on said shunt and disc, said disc engaging said cup upon melting of said solder pellet.

7. A line protector comprising means forming a circuit that comprises in series a surge arrester *of the cold cathode gas tube type having coaxial electrodes,* first conductor means for connection to a line to be protected, and second conductor means for connection to ground such that an overvoltage surge of short duration at the line will pass current through said series circuit for discharge to ground; fusible means normally preventing said first and second conductor means from being in contact, spring means for bringing said first and second conductor means into contact exteriorly of said surge arrester upon melting of said fusible means due to an overvoltage surge of longer duration across said series circuit to provide a direct metallic path from said line to ground bypassing said arrester, and means forming an arc gap between said first and second conductor means for providing a discharge path to ground in the event of failure of said surge arrester *due to leakage of gas therefrom, said last-named means comprising a perforated insulating member defining said arc gap between portions of said first and second conductor means that are radially outwardly of the electrode axis.*

8. A line protector comprising a cap, a metallic shunt member within the cap and being slidable relative thereto, a tubular insulating sleeve within the shunt member, a metallic disc member within the shunt member, a metallic cup within the sleeve and being slidable relative thereto, said sleeve being perforated to provide an air gap between the cup and the shunt member, a meltable pellet within the cup, a cold cathode surge arrester tube within the cup and having spaced electrodes respectively in electrical contact with the solder pellet and the disc, said electrodes providing a sealed arc gap within the tube that is greater *in width* than *the width of* said air gap, the environment within said tube being such that the arc-over voltage is less than the arc-over voltage at said air gap, and a spring within said cap for moving an assembly comprising said shunt, said disc, said arrester, and said sleeve upon melting of said pellet to cause said disc to engage said cup.

9. A line protector comprising first conductive means that includes a tubular cap and structure slidably telescoped within the cap coaxial therewith, second conductive means coaxial with said cap, a surge arrester having opposed conductor elements, said first and second conductive means being respectively connected to said conductor elements to provide a current path through said arrester from one conductive means to the other conductive means upon an overvoltage surge of short duration across said surge arrester, spring means in said cap urging said slidable structure toward said second conductive means, and a fusible element preventing engagement of said movable structure with said second conductive means except on melting of said fusible element due to an overvoltage surge of longer duration across said arrester, the engagement of said movable structure and said second conductive means forming a metallic current path bypassing said arrester, *and an insulating sleeve interposed between and spacing said first and second conductive means, said sleeve having at least one perforation constituting an air gap between said first and second conductive means.*

10. A line protector according to claim 9 in which said second conductive means comprises a cup, said arrester and said fusible element being in said cup, and said fusible element is disposed between said arrester and the base of said cup.

11. A line protector according to claim 9 in which said conductor elements form an arc gap *radially outwardly of the surge arrester.*

12. A line protector according to claim 9 in which said fusible element is a current-carrying pellet in conductive connection with one of the conductor elements of the arrester.

*13. A line protector comprising means forming a circuit that comprises in series a fusible solder pellet, spaced electrodes forming an arc gap, first conductor means for connection to a line to be protected, and second conductor means for connection to ground such that an overvoltage surge of short duration at said line will pass current through said series circuit for discharge to ground; said arc gap being sealed in a cold cathode gas tube of which said electrodes form a part; means including said solder pellet normally preventing said first and second conductor means being in contact, and spring means for bringing said first and second conductor means into contact exteriorly of said tube to bypass said arc gap upon melting of said solder pellet due to an overvoltage surge of longer duration across said series circuit and thereby provide a direct metallic path from said line to ground, and in which one of said conductor means includes a cup, said solder pellet and said tube are in said cup, an insulating sleeve surrounds said cup, and the other conductor means surrounds said insulating sleeve.*

*14. A line protector according to claim 13 in which said insulating sleeve is perforated to provide an air gap between said sleeve and said other conductor means.*

*15. A line protector according to claim 14 in which said other conductor means includes a shunt member that surrounds said insulating sleeve and a cap that surrounds and engages said shunt member.*

*16. A line protector according to claim 15 in which said other conductor means further includes a disc within said shunt, said spring means is in said cap and imposes pressure on said shunt and disc, said disc engaging said cup upon melting of said solder pellet.*

* * * * *